United States Patent
Aoshima

(10) Patent No.: US 8,666,060 B2
(45) Date of Patent: Mar. 4, 2014

(54) CALL SIGNAL GENERATING DEVICE

(75) Inventor: Takuma Aoshima, Shizuoka (JP)

(73) Assignee: NEC Access Technica Ltd, Shizuoka (JP)

( * ) Notice: Subject to any disclaimer, the term of this patent is extended or adjusted under 35 U.S.C. 154(b) by 261 days.

(21) Appl. No.: 13/103,898

(22) Filed: May 9, 2011

(65) Prior Publication Data

US 2011/0299677 A1     Dec. 8, 2011

(30) Foreign Application Priority Data

Jun. 2, 2010 (JP) ................................ 2010-126383

(51) Int. Cl.
*H04M 3/00* (2006.01)
*G08B 3/10* (2006.01)

(52) U.S. Cl.
USPC ....................................... 379/418; 340/384.7

(58) Field of Classification Search
None
See application file for complete search history.

(56) References Cited

U.S. PATENT DOCUMENTS

| 4,367,376 | A | * | 1/1983 | Proctor et al. | 340/328 |
| 5,436,822 | A | * | 7/1995 | West, Jr. | 363/63 |
| 6,005,437 | A | * | 12/1999 | Kay et al. | 330/146 |
| 6,320,940 | B1 | * | 11/2001 | Oi | 379/27.01 |
| 6,873,702 | B1 | * | 3/2005 | Rossi et al. | 379/399.01 |

FOREIGN PATENT DOCUMENTS

JP    2-257744 A    10/1990

* cited by examiner

*Primary Examiner* — Fan Tsang
*Assistant Examiner* — Jeffrey Lytle
(74) *Attorney, Agent, or Firm* — Sughrue Mion, PLLC

(57) ABSTRACT

A call signal generating device, whose pair of output terminals is connected to a telephone set, includes a rectifier rectifying an inputted high frequency signal and maintaining an output polarity in one of two polarities; and a polarity reverser generating a call signal by periodically reversing the output polarity of the rectifier and supplying it to the telephone set via the pair of output terminals.

6 Claims, 6 Drawing Sheets

CALL SIGNAL GENERATING DEVICE

This application is based upon and claims the benefit of priority from Japanese Patent Application No. JP 2010-126383, filed on Jun. 2, 2010, the disclosure of which is incorporated herein in its entirety by reference.

TECHNICAL FIELD

The present invention relates to a call signal generating device and relates to for example, a call signal generating device whose pair of output terminals is connected to a telephone set.

BACKGROUND ART

A call signal is a signal for informing a subscriber of reception of an incoming call when the call arrives. The call signal is also called as a ringer signal or a melody call signal. When the telephone set receives this call signal, a bell is rung in the telephone set. The call signal is generated in a telephone exchange equipment or some terminals and transmitted to the telephone set. Usually, the call signal conforms to the standard of each country. The call signal is a sinusoidal wave having a frequency of 10 to 70 Hz and an amplitude of around 200 $V_{p-p}$ and it is transmitted during ON time and not transmitted during OFF time. For example, in Japan, the call signal whose frequency is 16 Hz, ON time is one second, and OFF time is two seconds is generated.

In a process for generating the call signal, a high voltage is generated by switching on and off a direct current low voltage that is usually safe for the human body even if the human body makes contact with it. However, there is a risk of electric shock when the human body comes into contact with the high voltage line in a process in which the call signal is generated because the generated voltage is a high voltage.

In contrast, in a call signal generating device described in patent document 1 (Japanese Patent Application Laid-Open No. 1990-257744), a high frequency signal of about 10 to 100 kHz from a high frequency generating circuit is inputted during an ON period, a switching component is driven by the high frequency signal to switch on and off a direct current power supply voltage $V_{cc}$ via a step-up transformer, and whereby a high frequency voltage of about 75 V is generated on a secondary side of a transformer. Next, a positive component and a negative component are cut out by two diodes from the high frequency voltage that is an output of the transformer. The positive component output and the negative component output are periodically turned on and off, respectively and whereby a signal whose polarity is periodically reversed is generated. After that, the signal is smoothed and supplied to the telephone set as the call signal.

In the call signal generating device described in patent document 1, because the direct current power supply voltage is switched on and off at a high frequency of for example 100 kHz when the voltage is increased, the influence on the human body is small although the output voltage of the transformer is high. The signal whose polarity is periodically reversed is generated at a subsequent stage of the transformer. Accordingly, even if the human body comes into contact with arbitrarily two points, there is no case in which the human body comes into contact with the two points each of which has a positive polarity and a negative polarity. Therefore, the call signal generating device has high safety.

SUMMARY

An object of the present invention is to solve the above-mentioned problem and provide a call signal generating device having high safety which has a different configuration from a conventional one.

A call signal generating device, whose pair of output terminals is connected to a telephone set, includes a rectifier rectifying an inputted high frequency signal and maintaining an output polarity in one of two polarities; and a polarity reverser generating a call signal by periodically reversing the output polarity of the rectifier and supplying it to the telephone set via the pair of output terminals.

BRIEF DESCRIPTION OF THE DRAWINGS

Exemplary features and advantages of the present invention will become apparent from the following detailed description when taken with the accompanying drawings in which:

FIG. 3A shows a voltage waveform between two input points of a transformer 2, FIG. 3B shows a voltage waveform after rectification by a half-wave rectification section 3, FIG. 3C shows a voltage waveform after polarity reversing control by a polarity reversing section 4, and FIG. 3D shows a waveform of a signal after passing through a low-pass filter 5 that is used as a call signal;

FIG. 4A shows a voltage waveform between two input points of a transformer 2, FIG. 4B shows a voltage waveform after rectification by a half-wave rectification section 3, FIG. 4C shows a voltage waveform after polarity reversing control by a polarity reversing section 4, and FIG. 4D shows a waveform of a signal after passing through a low-pass filter 5 that is used as a call signal;

FIG. 5A shows a voltage waveform between two input points of a transformer 2, FIG. 5B shows a voltage waveform after rectification by a half-wave rectification section 3, FIG. 5C shows a voltage waveform after polarity reversing control by a polarity reversing section 4, and FIG. 5D shows a waveform of a signal after passing through a low-pass filter 5 that is used as a call signal.

EXEMPLARY EMBODIMENT

Exemplary embodiments of the present invention will now be described in detail in accordance with the accompanying drawings.

First Exemplary Embodiment

Figure 1:
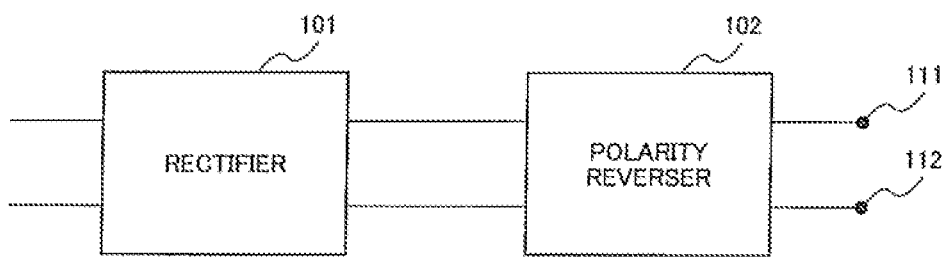
FIG. 1 is a figure showing a schematic configuration of a call signal generating device for explaining a principle of the present invention.

In order to help understanding of the present invention, a principle of the present invention will be described with reference to FIG. 1 before describing an exemplary embodiment of the present invention.

A call signal generating device according to the present invention is a call signal generating device whose pair of output terminals 111 and 112 is connected to a telephone set. The call signal generating device includes rectifier 101 and polarity reverser 102. The rectifier 101 rectifies the inputted high frequency signal and maintains an output polarity of the signal in one of two polarities. The polarity reverser 102 generates the call signal by periodically reversing the output polarity of the rectifier 101 and supplies it to the telephone set via the pair of output terminals 111 and 112.

Thus, the rectifier 101 rectifies the inputted high frequency signal and maintains the output polarity in one of two polarities and the polarity reverser 102 generates the call signal by periodically reversing the output polarity that is maintained in one of two polarities by the rectifier 101. As a result, a risk of electric shock can be suppressed by employing a different configuration from a conventional one and whereby safety can be increased.

The exemplary embodiment of the present invention will be described below with reference to the drawings.

Figure 2:
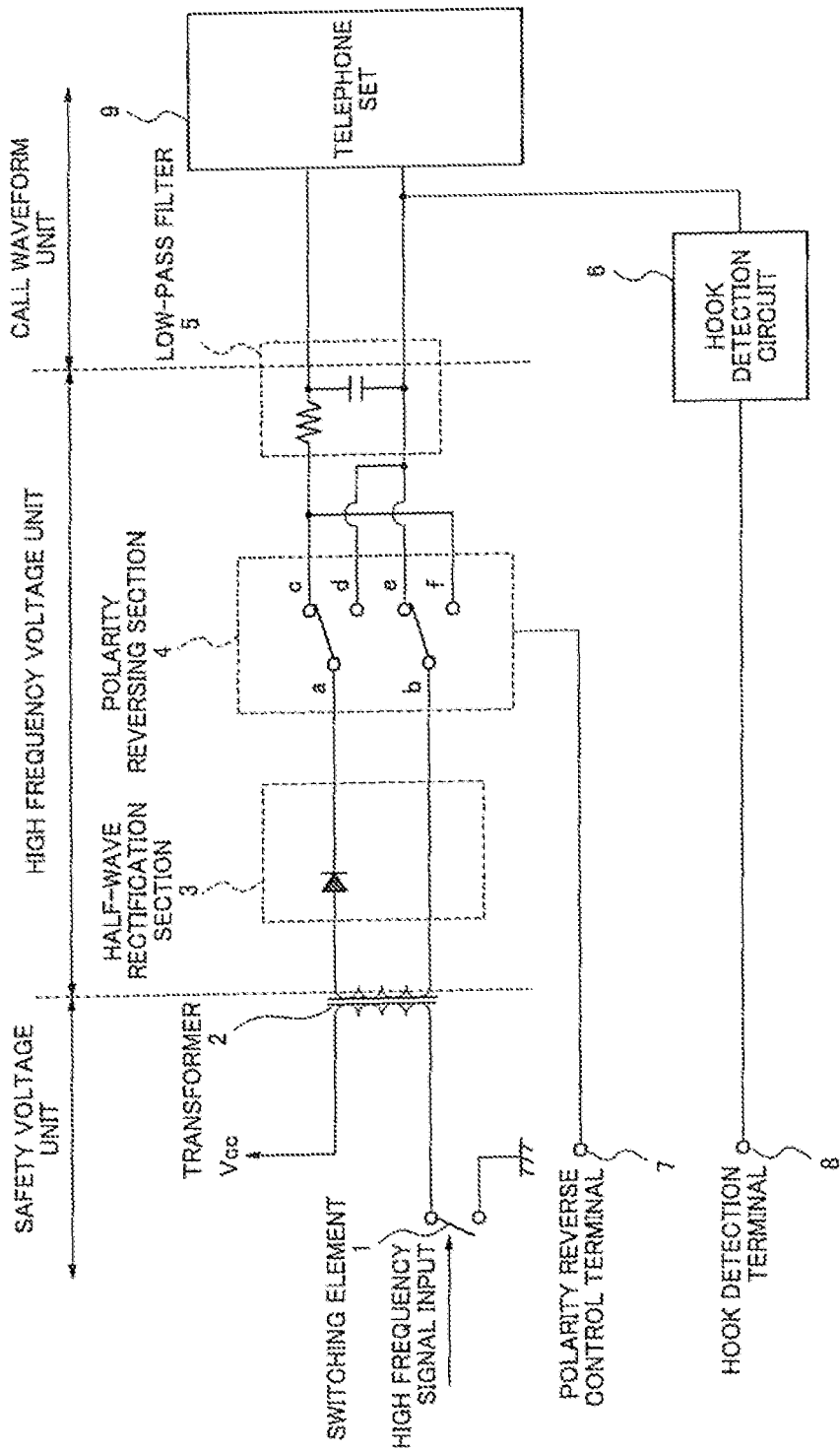
FIG. 2 is a figure showing a configuration of a call signal generating device according to a first exemplary embodiment of the present invention.

FIG. 2 is a figure showing a configuration of a call signal generating device according to a first exemplary embodiment of the present invention. In FIG. 2, the call signal generating device according to the first exemplary embodiment of the present invention includes a switching element 1, the transformer 2, the half-wave rectification section 3, the polarity reversing section 4, the low-pass filter 5 composed of RC (resistor and capacitor) elements, and a hook detection circuit 6.

The call signal generating device according to the first exemplary embodiment of the present invention is composed of a safety voltage unit, a high frequency voltage unit, and a call waveform unit. In the safety voltage unit, a direct current voltage $V_{cc}$ of 3.3 V, 24 V, or the like that hardly affects the human body and an alternating current voltage obtained by switching the direct current voltage on and off are used. If a direct current voltage is used in the high frequency voltage unit, it affects the human body. For this reason, by switching on and off the direct current voltage at a high frequency, the influence on the human body is reduced. The call waveform unit generates the call signal.

In the safety voltage unit, when the high frequency signal is inputted, the switching element 1 is driven by the inputted high frequency signal and the direct current voltage $V_{cc}$ is switched on and off via the transformer 2. In this case, a switching frequency on an output side of the transformer 2 is equal to that on an input side. In order to avoid the electric shock that occurs upon contact of a human body, it is necessary to adjust a voltage according to the frequency. For example, when the switching frequency is 100 kHz, it is desirable that an alternating current voltage between two points is suppressed below about 140 V0-p. The transformer 2 increases a voltage according to a transformer winding turns ratio. A transformer which can transmit a signal of a high frequency band has to be used for the transformer 2. An insulating type transformer is not necessarily used.

The high frequency voltage unit includes a circuit from the output side of the transformer 2 that is a stepped up voltage side to the low-pass filter 5. The high frequency voltage unit generates a high frequency high voltage below about 140 V. The high frequency voltage that is an output of the transformer 2 is half-wave rectified by the half-wave rectification section 3. The output of the transformer 2 can be used as a unipolar power supply by using the half-wave rectification section 3. A voltage increase method and a rectification method are not limited to the method described in this exemplary embodiment if the unipolar power supply and the high frequency signal can be obtained. Further, if the voltage of the inputted high frequency signal is sufficiently high, it is not necessary to use the transformer 2.

The polarity reversing section 4 periodically reverses the output polarity of the half-wave rectification section 3 by periodically changing a connection state of a terminal. Namely, the polarity reversing section 4 periodically changes the connection state between a first connection state in which a terminal a is connected to a terminal c and a terminal b is connected to a terminal e and a second connection state in which a terminal a is connected to a terminal d and a terminal b is connected to a terminal f and whereby the output polarity of the half-wave rectification section 3 is periodically reversed. This control is performed when a control unit (not shown) transmits a control signal to a polarity reverse control terminal 7. This control may be performed through a plurality of terminals instead of one terminal. The output polarity is reversed by the polarity reversing section 4 according to the desired call signal frequency. For example, when the call signal of 20 Hz is generated, the polarity reversing section 4 reverses the polarity every 25 ms. Further, by using a transistor, a field-effect transistor, a relay, a thyristor, a photo relay, or the like, the polarity reversing section 4 can be obtained.

The low-pass filter 5 that is a smoothing section removes a switching frequency from the signal obtained by periodically reversing the polarity. As a result, the waveform of the call signal is formed after the signal obtained by periodically reversing the polarity passes through the low-pass filter 5. Because a resistor can be used as an input load for the call signal, the low-pass filter 5 includes a resistor. However, an inductor may be used for the low-pass filter 5. Further, another circuit configuration can be used for the low-pass filter if it functions as a low-pass filter.

In the call waveform unit, the call signal is formed. The call waveform unit is provided at a subsequent stage of the low-pass filter 5. When a telephone set 9 is connected between a pair of output terminals of the call signal generating device, a bell of the telephone set 9 can be rung by the call signal. In this exemplary embodiment, the hook detection circuit 6 is further provided. When the telephone set is on-hooked, the hook detection circuit 6 can detect an on-hook state of the telephone set. A detection signal of the hook detection circuit 6 is transmitted to a control unit (not shown) via a hook detection terminal 8. Further, a hook detection function may not be connected to this place.

When the call signal is turned on and off (for example, in Japan, the call signal is turned on for 1 second and turned off for 2 seconds, and these are repeated), the OFF time of the call signal can be realized by inputting no high frequency signal to a primary side of the transformer 2. Because a high voltage waveform is not generated in the high frequency voltage unit by inputting no high frequency signal at the OFF time of the call signal, the call signal can be safely generated. However, the turning on and off of the call signal may be not necessarily performed by turning on and off a supply of the inputted high frequency signal to the primary side of the transformer 2. Namely, another method, for example, a method of which a switch disposed between the half-wave rectification section 3 and the polarity reversing section 4 turn on and off the supply of the signal from the half-wave rectification section 3 to the polarity reversing section 4 may be adopted. A transistor, a field-effect transistor, a relay, a thyristor, a photo relay, or the like can be used for this switch.

Figure 3:
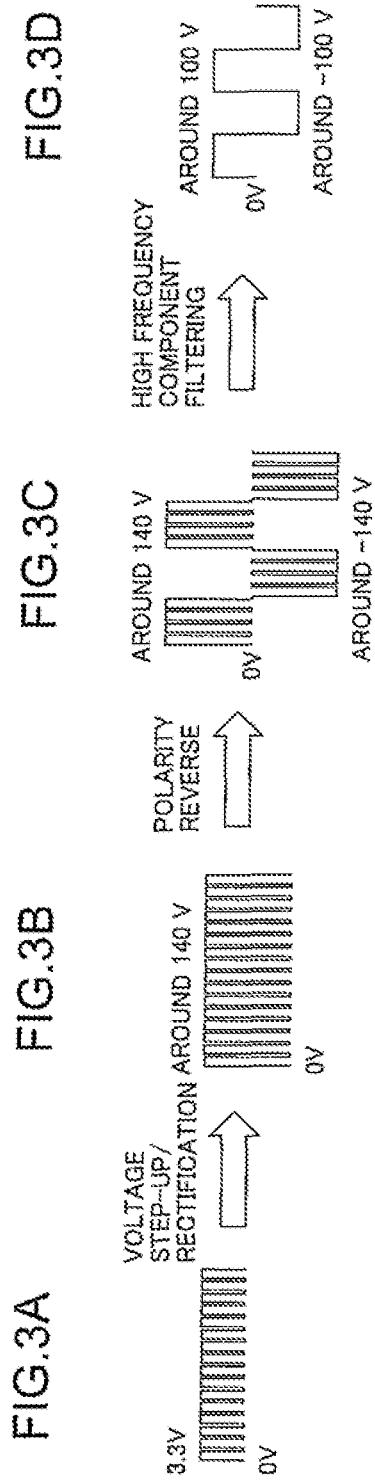
FIG. 3 is a figure showing a signal voltage waveform at each point of the call signal generating device shown in FIG. 2 when a high frequency signal is inputted (ON time of a call signal)

Next, the signal voltage waveform at each point of the call signal generating device according to the first exemplary embodiment of the present invention will be described with reference to FIG. 2 and FIG. 3. FIG. 3 is a figure showing a signal voltage waveform at each point of the call signal generating device shown in FIG. 2 when the high frequency signal is inputted (ON time of the call signal). FIG. 3A shows a voltage waveform between two input points of the transformer 2. FIG. 3B shows a voltage waveform after rectification by the half-wave rectification section 3. FIG. 3C shows a voltage waveform after polarity reversing control by the polarity reversing section 4. FIG. 3D shows a waveform of a signal after passing through the low-pass filter 5 that is used as the call signal.

In the safety voltage unit, the switching element 1 is driven by the inputted high frequency signal and the direct current voltage $V_{cc}$ of 3.3 V is switched on and off (refer to FIG. 3A). In the high frequency voltage unit, the voltage after rectification by the half-wave rectification section 3 shown in FIG. 3B is a high voltage of about 140 V. However, because it is a high frequency of for example, 100 kHz, the influence on the human body is small.

As shown in FIG. 3C, the polarity reversing section 4 generates a signal whose polarity is reversed periodically. However, only the polarity is reversed. Therefore, even if the human body comes into contact with arbitrarily two points, there is no case in which the human body comes into contact with the two points each of which has a positive polarity and a negative polarity. In this case, an electrical potential difference between two points is up to 140 V. This electrical potential difference is small and whereby the call signal generating device has high safety compared to a call signal generating device in which both a positive and a negative voltage power supplies are used.

As shown in FIG. 3D, when the low-pass filter 5 attenuates the high frequency component of the signal, the call signal is generated. FIG. 3 shows an example of a voltage. Therefore, the voltage at each point can be changed according to a circuit configuration or a voltage of the call signal to be generated.

Figure 4:
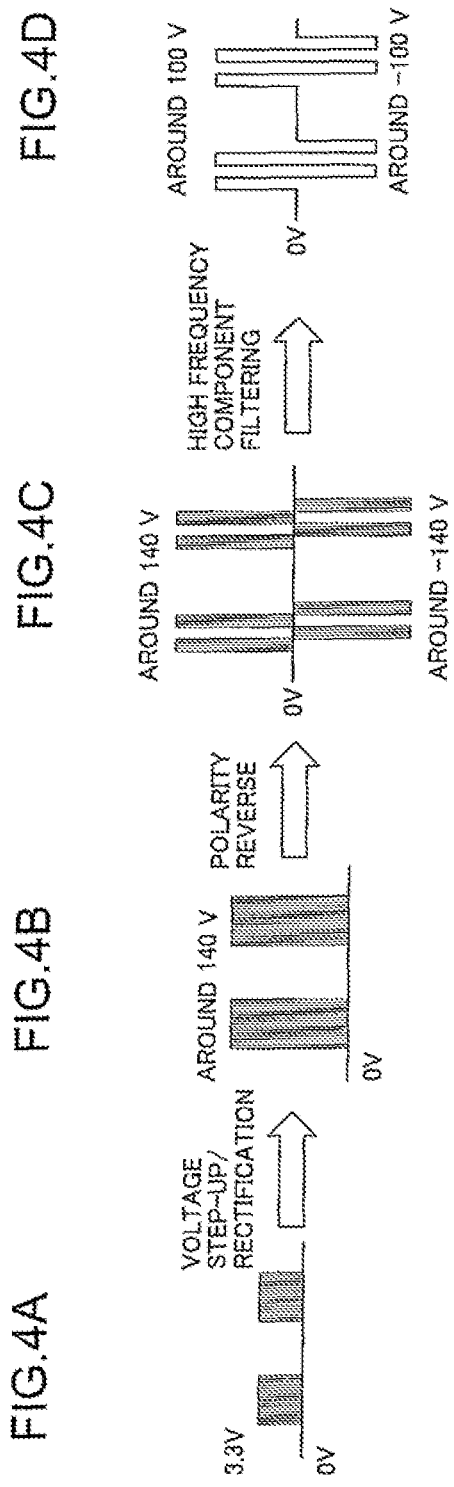
FIG. 4 is a figure showing a signal voltage waveform at each point of the call signal generating device shown in FIG. 2 when a high frequency signal is inputted and not inputted (ON time and OFF time of a call signal)

FIG. 4 is a figure showing a signal voltage waveform at each point of the call signal generating device shown in FIG. 2 when the high frequency signal is inputted and not inputted (ON time and OFF time of the call signal). FIG. 4A shows a voltage waveform between two input points of the transformer 2. FIG. 4B shows a voltage waveform after rectification by the half-wave rectification section 3. FIG. 4C shows a voltage waveform after polarity reversing control by the polarity reversing section 4. FIG. 4D shows a waveform of a signal after passing through the low-pass filter 5 that is used as the call signal.

In each of FIG. 4A to FIG. 4D, a period in which a voltage is changing is the ON time. The waveform shown in FIG. 4A to FIG. 4D corresponds to the waveform shown in FIG. 3A to FIG. 3D. In the OFF time, the high frequency signal is not inputted and the switching is not performed (refer to FIG. 4A). Accordingly, because the high voltage waveform is not generated in the high frequency voltage unit during the OFF time, a power consumption can be suppressed and the call signal can be safely generated.

As described above, in the first exemplary embodiment of the present invention, the output polarity is maintained in one of two polarities by the half-wave rectification section 3 and the polarity reversing section 4 periodically reverses the output polarity to generate the call signal. By using such method, a risk of electric shock can be suppressed by using a different configuration from a conventional one and whereby safety can be increased.

Second Exemplary Embodiment

Figure 5:
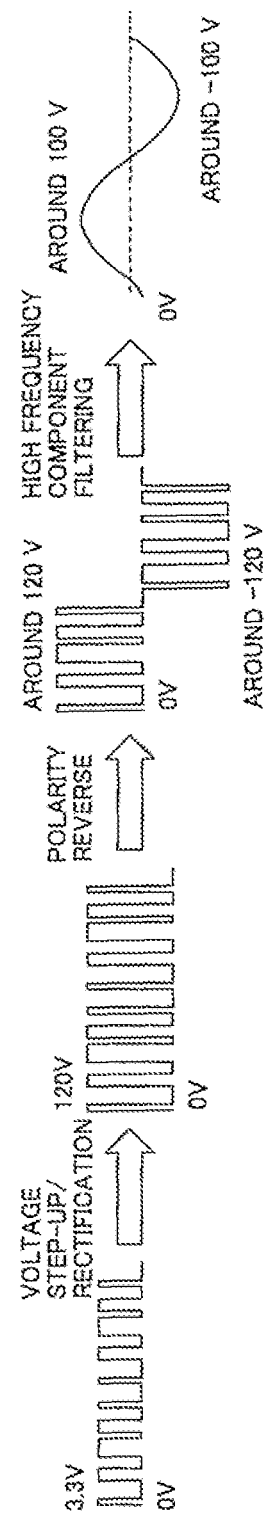
FIG. 5 is a figure showing a signal voltage waveform at each point of a call signal generating device according to a second exemplary embodiment of the present invention when a high frequency signal is inputted (ON time of a call signal)

Next, a second exemplary embodiment of the present invention will be described with reference to the drawing. A configuration of a call signal generating device according to the second exemplary embodiment of the present invention is the same as that of the call signal generating device shown in FIG. 2 but the input waveform is improved. FIG. 5 is a figure showing a signal voltage waveform at each point of the call signal generating device according to the second exemplary embodiment of the present invention when the high frequency signal is inputted (ON time of the call signal). FIG. 5A shows a voltage waveform between two input points of the transformer 2. FIG. 5B shows a voltage waveform after rectification by the half-wave rectification section 3. FIG. 5C shows a voltage waveform after polarity reversing control by the polarity reversing section 4. FIG. 5D shows a waveform of a signal after passing through the low-pass filter 5 that is used as the call signal.

As shown in FIG. 5A to FIG. 5D, the call signal having a sinusoidal waveform can be generated by inputting a signal waveform which is pulse width modulated according to the desired sinusoidal signal at the input side. Further, the call signal having a sinusoidal waveform may be generated by inputting a signal waveform which is pulse amplitude modulated according to the desired sinusoidal signal at the input side. Because a configuration of the second exemplary embodiment of the present invention is the same as that of the first exemplary embodiment, the second exemplary embodiment has the same effect as the first exemplary embodiment. In the second exemplary embodiment of the present invention, an electric power loss can be reduced compared to the power loss when the call signal is a square wave. Additionally, because the power consumption of the high frequency voltage unit can be reduced by reducing the electric power loss, safety of the circuit can be improved.

As shown in FIG. 2, although the call signal generating device according to the first and second exemplary embodiment of the present invention includes the half-wave rectification section 3 as the rectifier, it may use another rectification system such as a single-phase full-wave rectification system, a single-phase bridge rectification system, a two-phase full-wave rectification system, or the like for the rectifier.

Figure 6:
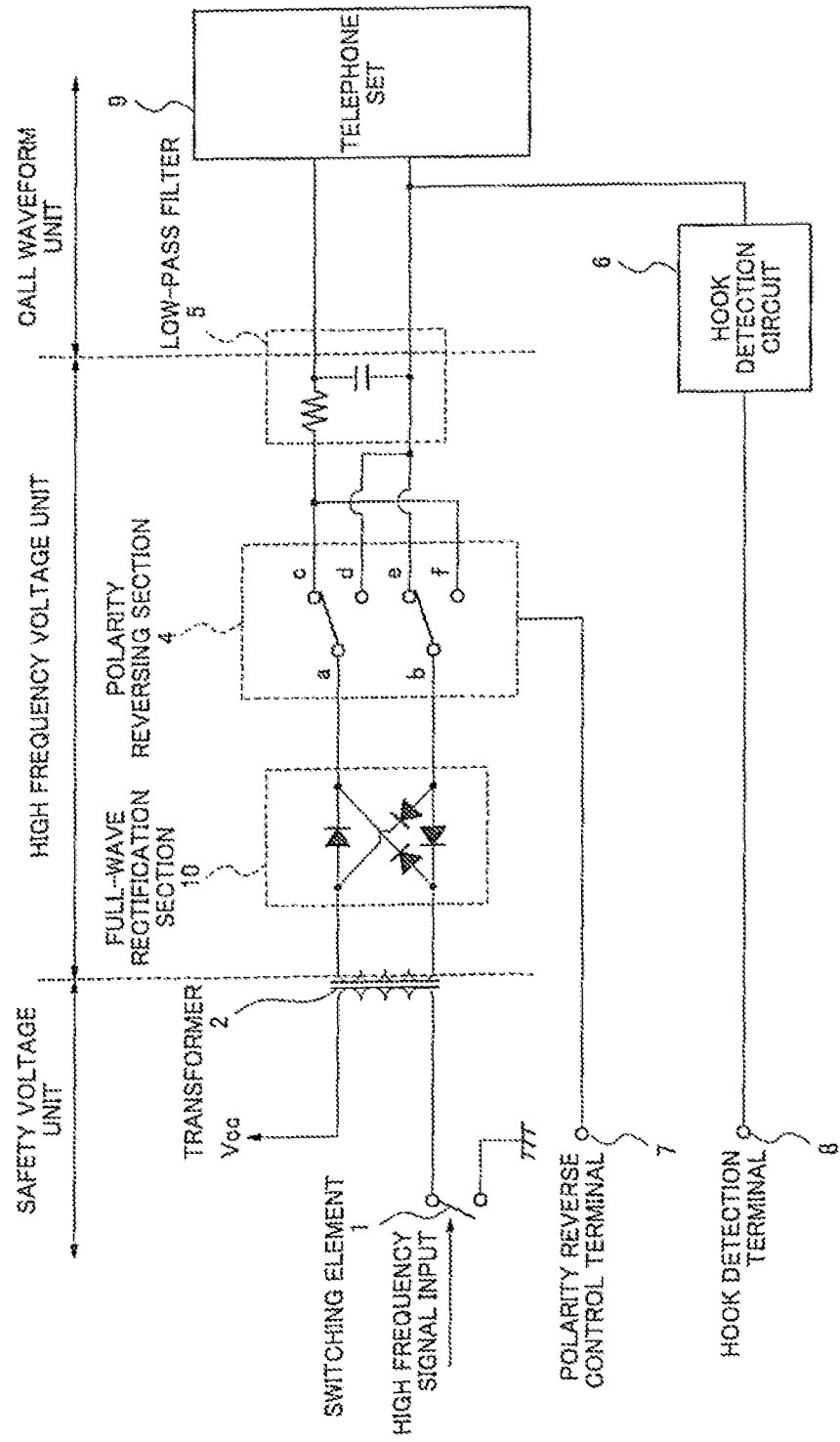
FIG. 6 is a figure showing a configuration of a call signal generating device according to a third exemplary embodiment of the present invention.

FIG. 6 is a figure showing a configuration of a call signal generating device according to a third exemplary embodiment of the present invention. In FIG. 6, the same reference numbers are used for the section having the same function as the section shown in FIG. 2. As shown in FIG. 6, a basic configuration of the call signal generating device according to the third exemplary embodiment of the present invention is the same as that of the first and second exemplary embodiments of the present invention. On the other hand, the call signal generating device according to the first and second exemplary embodiments of the present invention includes the half-wave rectification section 3 but the call signal generating device according to the third exemplary embodiment includes a full-wave rectification section 10 instead of the half-wave rectification section 3. Because the basic configuration of the third exemplary embodiment of the present invention is the same as that of the first exemplary embodiment, the third exemplary embodiment of the present invention has the same effect as the first exemplary embodiment. Additionally, the third exemplary embodiment of the present invention uses a full-wave rectifier circuit and whereby a peak voltage is reduced by a half and a frequency is increased twice. Therefore, safety of the circuit can be further improved.

The call signal generating device having high safety in which a risk of electric shock is suppressed is disclosed in patent document 1 but it is desirable to provide a call signal generating device having high safety in which a risk of electric shock is suppressed by using a different configuration from that of the call signal generating device disclosed in patent document 1.

The present invention has an effect in which a risk of electric shock can be suppressed by using a different configuration from a conventional one and safety can be improved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

The invention claimed is:

1. A call signal generating device whose pair of output terminals is connected to a telephone set, the call signal generating device comprising:
   a transformer increasing an inputted high frequency signal and outputting a high frequency voltage;
   a rectifier rectifying an inputted high frequency signal voltage from the transformer and maintaining an output polarity in one of two polarities; and
   a polarity reverser generating a call signal by periodically reversing the output polarity of the rectifier and supplying it to the telephone set via the pair of output terminals,
   wherein the high frequency signal is a pulse signal which is pulse width modulated or pulse amplitude modulated according to a desired sinusoidal signal.

2. The call signal generating device according to claim 1, wherein
   the polarity reverser periodically reverses the output polarity of the rectifier by periodically changing a connection state between the pair of output terminals and a pair of output terminals of the rectifier corresponding to the pair of output terminals.

3. The call signal generating device according to claim 1, wherein
   the polarity reverser includes smoother smoothing an output of the rectifier whose polarity is periodically reversed and generating the call signal.

4. The call signal generating device according to claim 1, further comprising:
   a switch provided in front of the transformer and turning on and off a supply of the output of the rectifier to the polarity reverser.

5. The call signal generating device according to claim 1, wherein
   the rectifier is full-wave rectifier performing full-wave rectification.

6. A call signal generating device whose pair of output terminals is connected to a telephone set, the call signal generating device comprising:
   transformation means for increasing an inputted high frequency signal and outputting a high frequency voltage;
   rectification means for rectifying an inputted high frequency signal voltage from the transformation means and maintaining an output polarity in one of two polarities; and
   polarity reversing means for generating a call signal by periodically reversing the output polarity of the rectification means and supplying it to the telephone set via the pair of output terminals,
   wherein the high frequency signal is a pulse signal which is pulse width modulated or pulse amplitude modulated according to a desired sinusoidal signal.

\* \* \* \* \*